(12) United States Patent
Honsalek et al.

(10) Patent No.: US 10,873,779 B1
(45) Date of Patent: Dec. 22, 2020

(54) WIRELESS MEDIA SERVER WITH MEDIA AND MEDIA-ACCESS APPLICATION DELIVERY

(71) Applicant: RENEW WORLD OUTREACH, INC., Stone Mountain, GA (US)

(72) Inventors: Brandon Karl Honsalek, Loganville, GA (US); David Palusky, Stone Mountain, GA (US); Michael Shivers, Stone Mountain, GA (US); Christopher Vollo, Stone Mountain, GA (US)

(73) Assignee: RENEW WORLD OUTREACH, INC., Stone Mountain, GA (US)

( * ) Notice: Subject to any disclaimer, the term of this patent is extended or adjusted under 35 U.S.C. 154(b) by 167 days.

(21) Appl. No.: 15/876,628

(22) Filed: Jan. 22, 2018

(51) Int. Cl.
| | |
|---|---|
| H04N 21/436 | (2011.01) |
| H04L 29/06 | (2006.01) |
| H04W 4/06 | (2009.01) |
| H04N 21/414 | (2011.01) |
| H04W 84/12 | (2009.01) |
| H04N 21/4363 | (2011.01) |
| H04L 29/08 | (2006.01) |

(52) U.S. Cl.
CPC ... *H04N 21/43615* (2013.01); *H04L 65/4084* (2013.01); *H04N 21/41407* (2013.01); *H04W 4/06* (2013.01); *H04L 67/06* (2013.01); *H04N 21/43637* (2013.01); *H04W 84/12* (2013.01)

(58) Field of Classification Search
CPC ....... H04N 21/43615; H04N 21/41407; H04N 21/43637; H04L 65/4084; H04L 67/06; H04W 4/06; H04W 84/12

USPC .......................................................... 709/203
See application file for complete search history.

(56) References Cited

U.S. PATENT DOCUMENTS

| | | | | |
|---|---|---|---|---|
| 8,516,039 | B2* | 8/2013 | Brown | H04N 21/26613 709/203 |
| 8,555,332 | B2* | 10/2013 | Brown | H04M 7/123 725/106 |
| 9,374,685 | B1 | 6/2016 | Jakatdar et al. | |
| 9,716,755 | B2 | 7/2017 | Borowiec et al. | |
| 10,349,111 | B2* | 7/2019 | Dua | |
| 2006/0224619 | A1 | 10/2006 | Kang et al. | |
| 2007/0130593 | A1 | 6/2007 | Choi et al. | |
| 2010/0250669 | A1 | 9/2010 | Pan | |
| 2012/0110118 | A1* | 5/2012 | Luna | H04L 67/2842 709/217 |

(Continued)

*Primary Examiner* — Kristie D Shingles
(74) *Attorney, Agent, or Firm* — Mitch Harris, Atty at Law, LLC; Andrew Mitchell Harris (57) ABSTRACT

A portable wireless media server device provides a local Wi-Fi or Bluetooth network connection to groups of people via their mobile telephones or other portable devices having media playback capability. The media server device provides three different mechanisms for automatically delivering audio/video media to mobile telephones. A BLUETOOTH pairing automatically pushes media files to a connected device, a Wi-Fi connection responds to DNS requests from a browser by pushing a media selection application from the media server device to the connected device that may also provide selection for download of an application package such as a Bible reader. A micro-SD card programming feature transfers media automatically to an inserted micro-SD card and optionally locks the card, preventing re-use for unintended purposes.

16 Claims, 7 Drawing Sheets

(56) References Cited

U.S. PATENT DOCUMENTS

| | | | |
|---|---|---|---|
| 2012/0135726 A1* | 5/2012 | Luna | H04W 12/06 455/422.1 |
| 2013/0014145 A1* | 1/2013 | Bhatia | H04N 21/252 725/13 |
| 2018/0338024 A1* | 11/2018 | Hardi | G06F 1/169 |

* cited by examiner

WIRELESS MEDIA SERVER WITH MEDIA AND MEDIA-ACCESS APPLICATION DELIVERY

BACKGROUND OF THE INVENTION

1. Field of the Invention

The present invention relates generally to a wireless media server that delivers media access automatically upon connection.

2. Description of the Related Art

Wireless networking devices and storage subsystems, such as "personal cloud" devices provide access to network-mapped storage. Such devices are typically connected to a wireless local-area network (WLAN) that provides other services such as Internet connectivity and access to other devices such as printers and other computing devices. Such storage subsystems typically permit users to upload media and playback the media at their convenience using standard operating systems' media player utilities or dedicated media playback applications. While set-up of such systems is typically facilitated by applications provided with the storage device, it is generally the user that controls what media can be installed and played back. For applications such as missionary work, it is desirable that devices provided for their use are dedicated to the purpose of playing media intended for the device, and it may not be desirable to provide access to anything other than specific media, e.g., sermons and scripture reading that cannot be overwritten with other media.

It would therefore be desirable to provide a wireless media server device that can provide access to and control over-writing of source-selected media without requiring Internet or other wireless network interaction, that controls access to the media and that does not require the user to download an application or to direct a built-in operating system file access program to transfer media.

SUMMARY OF THE INVENTION

The objective of providing a wireless media server device that provides control of media that can be played back and that does not require the user to download an application or direct a built in operating system to transfer media is achieved in a portable wireless media server device.

The portable wireless media server device includes a portable device housing which includes a Wi-Fi (a trademark of the Wi-Fi Alliance) radio, a processor circuit coupled to the Wi-Fi radio, a battery for providing operating current to the Wi-Fi radio and the processor circuit, and a memory coupled to the processor circuit for storing program instructions for operating the wireless media server device. The program instructions include program instructions for providing a private non-Internet Wi-Fi connection to another wireless device via the Wi-Fi radio. The program instructions automatically, in response to acceptance of the private non-Internet Wi-Fi connection by the another wireless device, pushes a page offering selection of media or an application image for delivery to the another wireless device, and in response to selection of the media or application image for delivery at the another wireless device, deliver the media or application image to the another wireless device. The portable wireless media server device may include a memory card connector and the program instructions may include program instructions that detect insertion of a memory card and automatically copy pre-selected media to the memory card and lock the memory card to render the memory card write-only. The portable wireless media server device may also include a BLUETOOTH (a trademark of the Bluetooth Special Interest Group) that delivers the pre-selected media in response to completion of pairing with another Bluetooth device.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present disclosure includes a portable wireless media server device that provides missionaries with the ability to provide media to users of mobile telephones via multiple techniques compatible with wireless mobile telephones or other types of media players, which may not have a full set of connection capabilities. The served media may be music, sermons, biblical passages, and other content that is suitable for the above uses, or other audio or video recorded media, as well as installable application such as a Bible reader. The portable wireless media server device supports BLUETOOTH connection capability, as well as Wi-Fi in order to perform wireless transfers of media and application packages, and for transfer to devices lacking wireless connectivity, the portable wireless media server device includes a memory card connector (e.g., a micro-SD card connector) into which a memory card (e.g., a micro-SD card) can be inserted. Secure Digital (SD) is a standard promulgated by the SD Association. Media is automatically transferred to the memory card and a hardware locking sequence is performed to prevent subsequent erasure of the memory card to ensure that the memory card is used for the intended purpose. A Universal Serial Bus connection is provided for charging of an internal battery that operates the portable wireless media server device, and optionally to provide a port for controlling the configuration of the portable wireless media server device and storing media for distribution within the internal memory of the portable wireless media server device.

Figure 1:
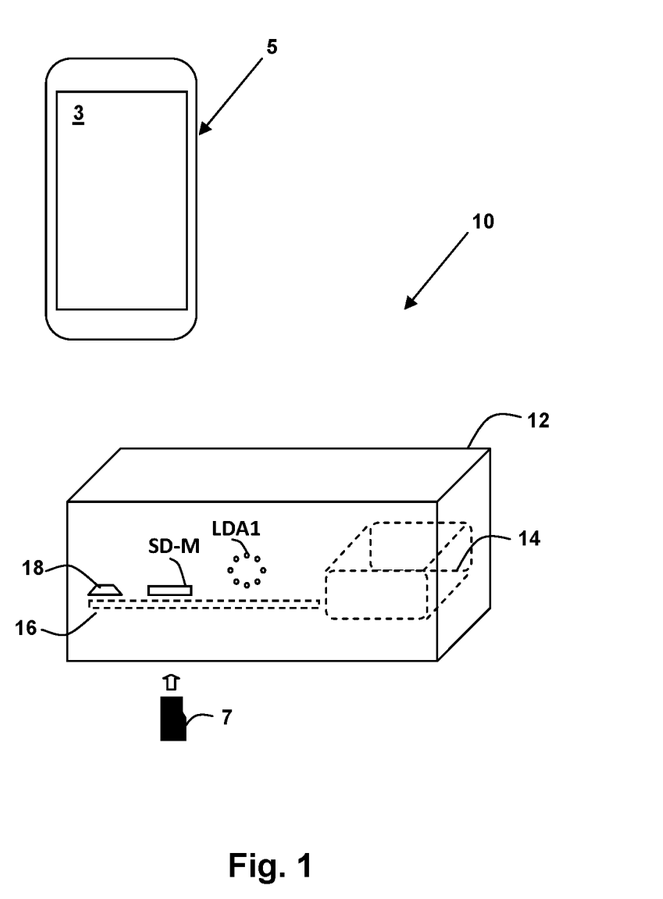
FIG. 1 shows an example of a portable wireless media server device 10.

Referring now to FIG. 1, an illustrative example of a portable wireless media server device 10 is shown in a front left perspective view. Portable wireless media server device 10 is contained in a housing 12 and self-powered via an internal battery 14. A printed circuit board (PCB) 16 on which a micro-USB connector 18 and a micro-SD card connector SD-M are mounted provides electrical interconnect and support so that the open end of the connectors extend through housing 12 and so that a micro-SD card 7 may be inserted and a USB cable connected. Other circuits within portable wireless media server device 10 that support the operations and structures described below are mounted on PCB 16. Housing 12 is suitable for pocket-carrying, having dimensions of approximately 0.75×2×3 inches. Certain media designated for automatic transfer from portable wireless media server device 10 are selected via an administrative interface accessible via Wi-Fi connection to portable wireless media server device 10 with proper administrative credentials. A wireless mobile telephone 5 is illustrated as a device that may connect to portable wireless media server device 10 and that has a touchscreen 3 for interacting with the various programs and media hosted by portable wireless media server device 10 as described below. A circular status LED array LDA1 is used to show the charge level of the battery, the percentage of file transfer over the micro-SD card connector SD-M and the number of users connected via Wi-Fi or Bluetooth.

Alternatively, separate LED arrays may be used to provide each of the status indicators.

Figure 2:
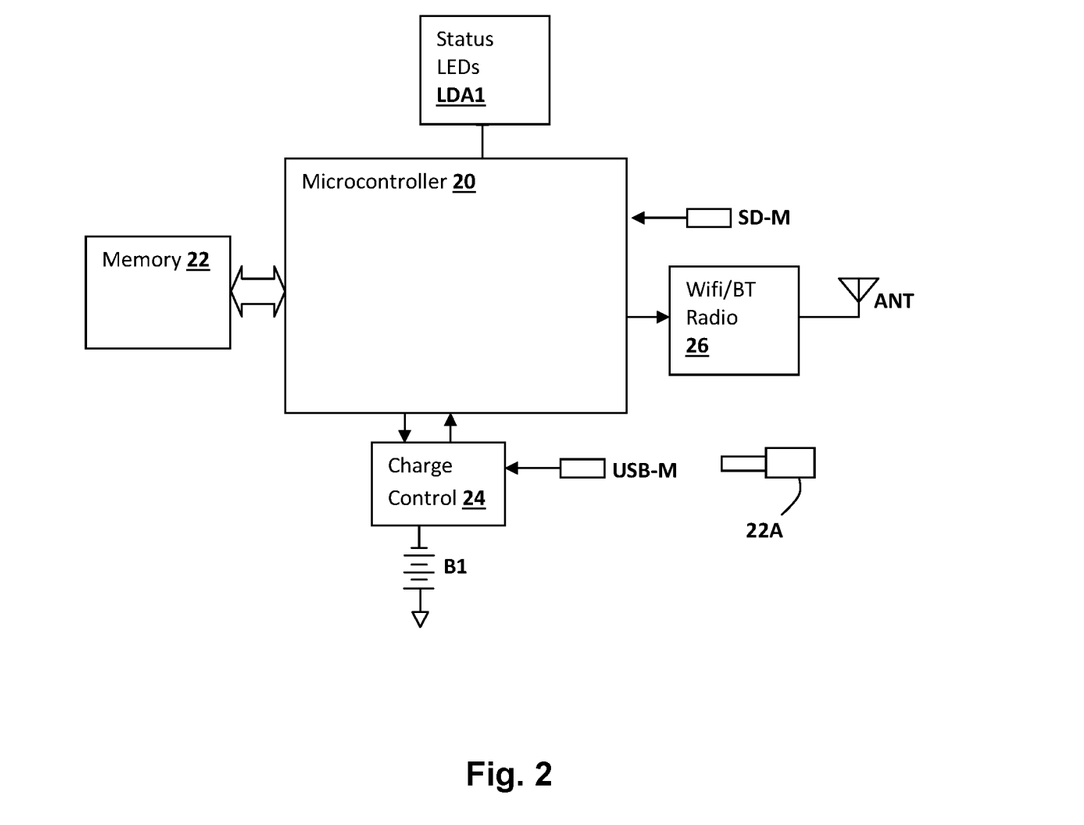
FIG. 2 is a block diagram of circuits within portable wireless media server device 10 of FIG. 1.

Referring now to FIG. 2, a block diagram of circuits within portable wireless media server device 10 is shown. A microcontroller 20, which may be a general-purpose microcontroller, or a special-purpose controller, provides control of the functions of portable wireless media server device 10. A memory 22 coupled to (or alternatively within or including storage within) microcontroller 20 provides program instructions directing the operation of portable wireless media server device 10 and is generally a FLASH memory. In particular, the program instructions direct transfer of media files from memory 22 to Wi-Fi or BLUETOOTH connected devices and transfer of media files to micro-SD card 7 when inserted in micro-SD card connector SD-M. A charge control circuit 24 provides charging of a battery B1 from a USB-micro connector USB-M. An optional USB Flash memory device 22A may also provide a source of media files for transfer. A Wi-Fi/Bluetooth radio 26 and an associated antenna ANT are integrated in housing 12, and Wi-Fi/Bluetooth radio 26 is coupled to and controlled by microcontroller 20 to direct connections and transfer of media as disclosed below. Circular status LED array LDA1 is also coupled to microcontroller 20 to provide the above-described display functions.

Program instructions executed within portable wireless media server device 10 implement a DHCP server, a DNS server and a Webserver from a Wi-Fi access point. A website hosted by the Webserver provides for streaming and downloading of media that is hosted by (i.e., stored within or connected to) portable wireless media server device 10 and does not require any internet connection for access. When a connecting device (a client) connects to a Wi-Fi network hosted by portable wireless media server device 10 and activates a browser to navigate to a website named URL, the DNS server always answers a DNS query with a local IP address of portable wireless media server device 10. Portable wireless media server device 10 thereby acts as a Wi-Fi "captive portal". A web page is then served up to the client. The web page provides an interface for selection of media (video, audio, applications, etc.) that can be streamed and/or downloaded by the client, as well as a contact form that can be filled out by a user of the connecting device fill out in order to provide contact information for later contact. Portable wireless media server device 10 also tracks statistics of the number of downloads, streams, and other activity generated by connected clients. The statistics are accessible to an administrator of portable wireless media server device 10.

Other program instructions within portable wireless media server device 10 implement a Bluetooth host to provide for transferring media (files) via the Bluetooth "Object Push Protocol" (OPP). The administrator of portable wireless media server device 10 selects which files are to be shared via Bluetooth (OPP). Upon establishing a connection with a Bluetooth device as a client, portable wireless media server device 10 initiates an OPP request to transfer a file to the connected Bluetooth device. If the connected device accepts the transfer, file transfer begins. Upon completion of the file transfer, portable wireless media server device 10 sends another OPP request for the next file that is set to be shared via Bluetooth. An initial Bluetooth connection is made in one of two ways: 1) Portable wireless media server device 10 can initiate the connection by setting portable wireless media server device 10 to a mode that scans for Bluetooth devices and attempts to initiate a connection with them, or 2) A Bluetooth connection can be initiated by the client. The connecting client device requests a connection to portable wireless media server device 10, which then initiates a OPP request to the client device upon accepting the connection. As described above with respect to the WiFi functionality described above, portable wireless media server device 10 keeps statistics of connection information, such as the number of the files transferred to a connected device via Bluetooth, which can be accessed by the administrator of the device.

Portable wireless media server device 10 also shares media via micro-SD card connector SD-M, USB-micro connector USB-M and an optional USB-A type connector that accepts standard USB Flash drives. When a storage device is connected to one of the above connectors, such as insertion of micro-SD card 7 into micro-SD card connector SD-M, portable wireless media server device 10 attempts to mount any filesystem present on the storage device and then commences to transfer files from portable wireless media server device 10 until all files (previously specified by the administrator of portable wireless media server device 10) have been transferred, or there is no more space left on the connected storage device. Portable wireless media server device 10 also keeps statistics of file transfer from portable wireless media server device 10 to the connected storage, which can be accessed by the administrator of portable wireless media server device 10. Portable wireless media server device 10 also provides an administrative option for automatically locking micro-SD cards that are connected via micro-SD card connector SD-M. The micro-SD cards are locked by setting the "temporary write protect" bit in the "card specific data register" of the connected micro SD-card. Locking can be initiated upon completion of the transfer of files to the connected micro-SD card.

Figure 3:
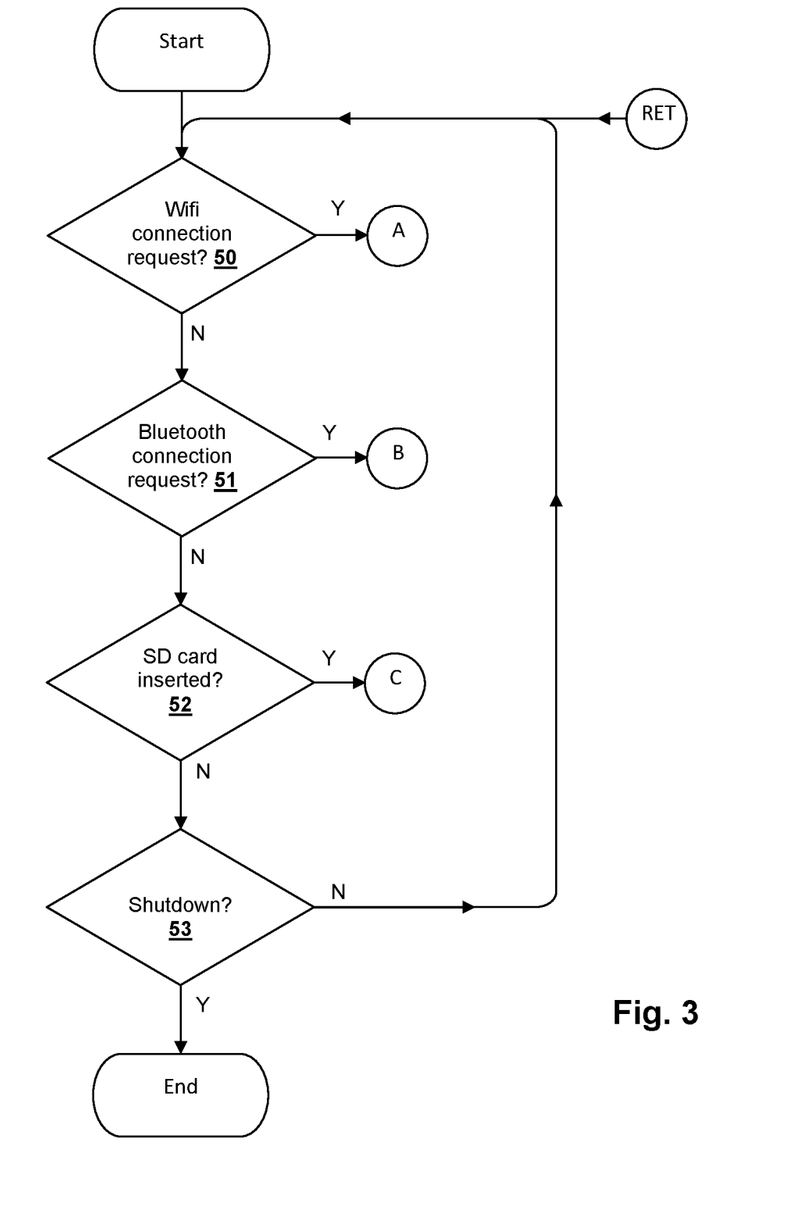
FIGS. 3-6 are flowcharts illustrating methods carried out by program instructions within portable wireless media server device 10 of FIGS. 1-2.

Referring now to FIG. 3, an example method for managing transfer of media is illustrated in a flowchart, as may be implemented by program instructions within memory 22 of portable wireless media server device 10 and executed by microcontroller 20. While, for the purpose of illustration, the individual Wi-Fi, Bluetooth and micro-SD card processes are illustrated in a sequential fashion in FIG. 3, in practice the individual routines illustrated in FIGS. 4-6 can be entered independently and concurrently. Tag RET indicates a return to the top of the flowchart, as illustrated. If a Wi-Fi connection request is received (decision 50) processing proceeds to the Wi-Fi connection processing method (tag A) illustrated in FIG. 4. If a Bluetooth connection request is received (decision 51), processing proceeds to the Bluetooth connection processing method (tag B) illustrated in FIG. 5. If a micro-SD card is inserted in micro-SD card connector SD-M (decision 52), processing proceeds to the memory card processing method (tag C) illustrated in FIG. 6. Until portable wireless media server device 10 is shut down (decision 53), the method illustrated in decisions 50-53 is repeated.

Figure 4:
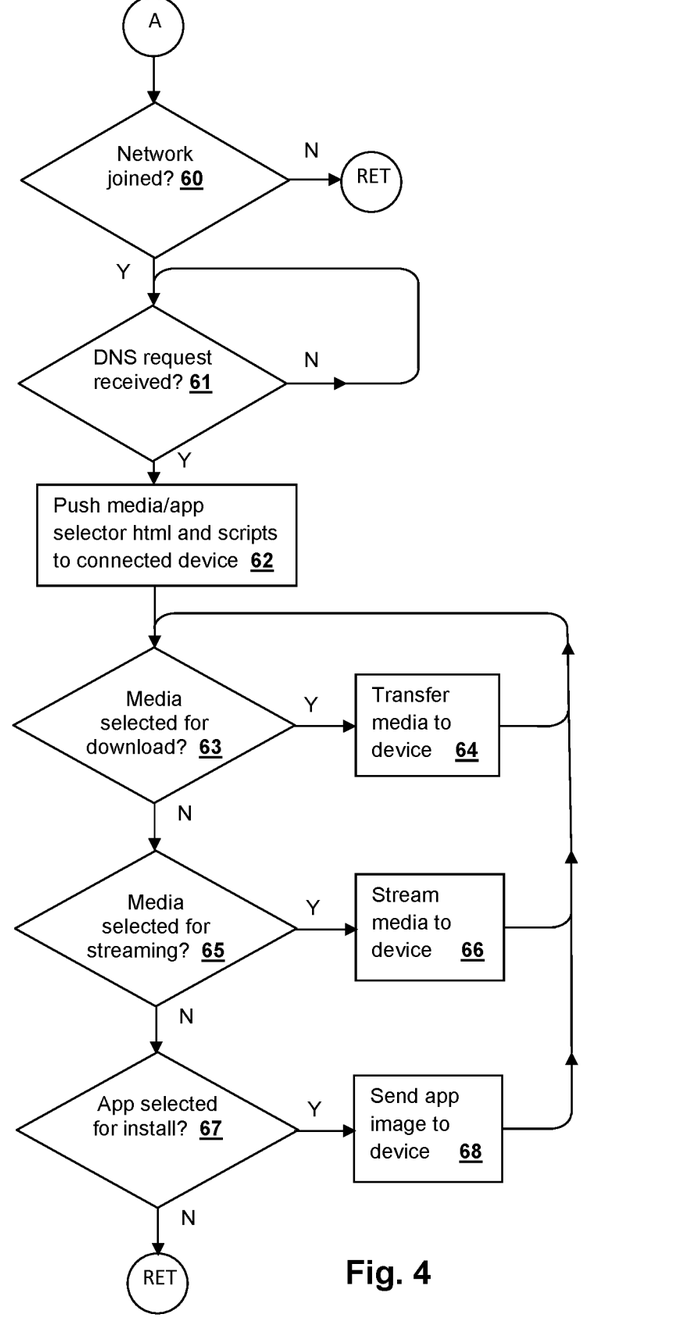

Referring to FIG. 4, an example method for handling Wi-Fi connections is shown in a flowchart, as the method illustrated in FIG. 3 proceeds from tag A. Once another device joins the Wi-Fi network hosted by portable wireless media server device 10 and locally generated via WiFi/Bluetooth radio 26 and antenna ANT (decision 60), until a (domain name server) DNS request to resolve a domain name is received, other tasks are performed, and the wireless connection method does not proceed (decision 61). The DNS request is generally a request to resolve the default web page URL when a browser is opened on the connected device. When opening a browser on the connected device, the default web page may be a secure website (https protocol), in which case the browser may have a stored certificate that causes a warning to be issued by the browser, prompting the user to accept or reject the certificate inconsistency in order to proceed.

Once a DNS request is received (decision 61), a PHP (PHP: Hypertext Preprocessor) application program executed within portable wireless media server device 10, pushes Javascript and an HTML file stored in memory 22 to the browser on the connected device (step 62). While the illustrated example is that of an HTML page, other types of web pages may be pushed to the connected device, including java code, active server pages (ASP), and similar code that is executable via the browser on the connected device. Once the user interacts with the page displayed in the browser to select one or more of the media files or an application, e.g., a Bible reader application, for transfer (decision 63), the media is transferred to the connected device (step 64) and eventually played via a media player application on the connected device, which does not require that the device remain connected. If media is selected for streaming (decision 65), then portable wireless media server device 10 serves the media as a stream (step 66). If an application is selected for installation (decision 67), then the application image is sent to the connected device for installation (step 68). As an example, the application may be an Android .apk file, which is an application image that can be installed and executed on an Android device, for example a Bible reader application containing the entire contents of the Bible for reading locally on the device, which does not require subsequent wireless connection.

Figure 5:
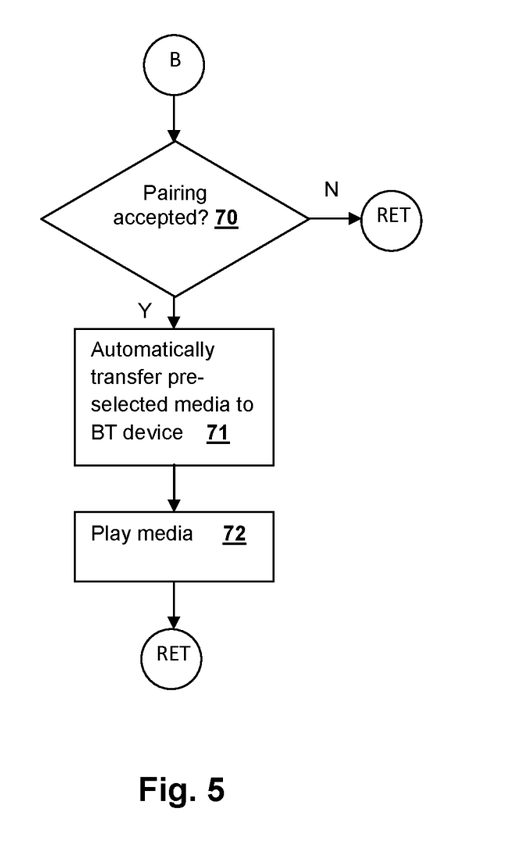

Referring now to FIG. 5, an example method for handling Bluetooth connections is shown in a flowchart, as the method illustrated in FIG. 3 proceeds from tag B. If pairing is accepted by a connecting device (decision 70), a Bluetooth "push" sequence is initiated by portable wireless media server device 10 by automatically initiating an object exchange (OBEX) and performing an OBEX transfer in response to acceptance of the object(s), which are media files pre-selected for transfer to any Bluetooth device that connects to portable wireless media server device 10 (step 71). Eventually, the media is played via a media player application on the connected device, which does not require that the device remain connected (step 72). The method illustrated in FIG. 5 can be used to push media simultaneously to multiple Bluetooth devices that accept pairing with the portable wireless media server device 10.

Figure 6:
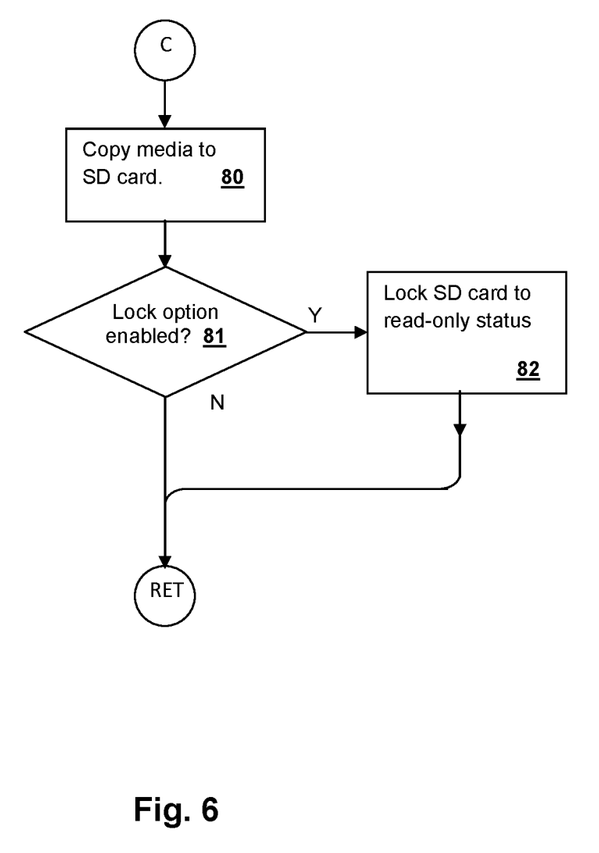

Referring now to FIG. 6, a method for transferring media to devices not having Wi-Fi or Bluetooth connection capability is shown in a flowchart, as the method illustrated in FIG. 3 proceeds from tag C. Upon detection of micro-SD card insertion in step 52 of FIG. 3, media that is marked as available in memory 20 is transferred automatically to the micro-SD card (step 80). Then, if an "automatic lock" option has previously been set via the administrative interface of portable wireless media server device 10 (decision 81), a card-locking sequence is performed to lock the micro-SD card to prevent use of the micro-SD card for an unintended purpose (step 82). Locking of the micro-SD card is performed by directly controlling the bus formed by the micro-SD card connections and sending a register write command to set the TMP_WRITE_PROTECT bit in the card specific data (CSD) register of the micro-SD card.

Figure 7:
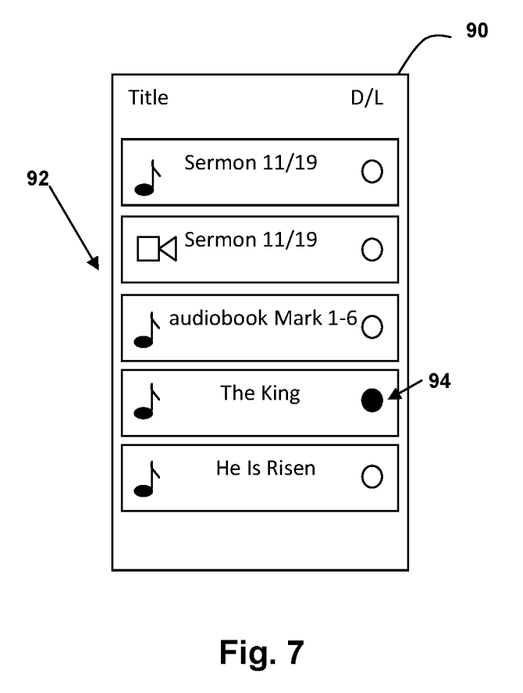
FIG. 7 is a pictorial view of a user interface that may be presented by portable wireless media server device 10 to a connected device, and is also exemplary of a Bluetooth push reception feature as may be implemented by the connected device.

Referring now to FIG. 7, an exemplary user interface that may be presented by portable wireless media server device 10 to a connected device, and is also exemplary of a Bluetooth push reception feature as may be implemented by the connected device, is shown. A user interface 90 is displayed on display 3 of a device such as wireless mobile telephone 5 of FIG. 1 and provides a list 92 (or other set of indicators such as icons) to the user of individual media files that may be selected by the user by touching a corresponding indicator 94.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A portable wireless media server device, comprising:
   a portable device housing;
   a Wi-Fi radio within the housing;
   a processor circuit within the housing and coupled to the Wi-Fi radio;
   a battery within the housing for providing operating current to the Wi-Fi radio and the processor circuit;
   a memory coupled to the processor circuit for storing program instructions for operating the portable wireless media server device, providing a private non-Internet connection to another wireless device via the Wi-Fi radio, and automatically, in response to acceptance of the private non-Internet connection by the another wireless device, pushing a page offering a selection of media or an application image for delivery to the another wireless device, and hi response to receiving an indication of selection of the media or the application image for delivery from the another wireless device, delivers the media or the application image to the another wireless device;
   wherein the program instructions for pushing the page offering selection of the media or the application image comprise program instructions for detecting connection of a Wi-Fi-enabled device as the another wireless device, pushing the page in response to any browser DNS request from the connected Wi-Fi-enabled device, whereby the portable wireless media server device delivers the media directly to Bluetooth-paired devices and delivers media to Wi-Fi-enabled devices only in response to receiving an indication of a user input at the another wireless device selecting the media or the application image; and a Bluetooth radio coupled to the processor, wherein the program instructions include program instructions for causing the Bluetooth radio to request pairing to a Bluetooth device, and responsive to acceptance of pairing of another Bluetooth device, automatically delivering preselected media as an object transfer to the Bluetooth device.

2. The portable wireless media server device of claim 1, wherein the program instructions comprise program instructions for accepting pairing with multiple Bluetooth devices, and wherein the program instructions for automatically delivering the preselected media deliver the media to individual ones of multiple Bluetooth devices in response to acceptance of pairing at the individual ones of the multiple Bluetooth devices.

3. The portable wireless media server device of claim 1, wherein the program instructions for pushing the page offering selection of the media or the application image comprise program instructions for pushing a page that offers selection of the application image for installation on the another wireless device, and in response to receiving an indication of a user input at the another wireless device selecting the media, delivers an application package containing the application image.

4. The portable wireless media server device of claim 3, wherein the program instructions further comprise program instructions for connecting to the another wireless device, automatically in response to a browser of the another wireless device issuing any DNS request, delivering and executing the page offering selection of the media or the application image in the browser of the another wireless device, receiving media selection or the application image selection from the page executing in the browser on the another wireless device, and delivering the selected media or the selected application image to the another wireless device.

5. The portable wireless media server device of claim 4, wherein the application image comprises an Android application that is executed on the portable device after delivery of the application image in response to receiving the application selection from the page.

6. The portable wireless media server device of claim 1, further comprising a digital memory card connector located at the housing and coupled to the processor circuit for receiving a digital memory card and coupled to the processor circuit for transferring the media to the digital memory card.

7. The portable wireless media server device of claim 6, wherein the digital memory card connector is a micro secure digital (micro-SD) card connector.

8. The portable wireless media server device of claim 6, wherein the program instructions include program instructions for detecting insertion of the digital memory card into the digital memory card connector, and responsive to detection of the insertion of the digital memory card into the digital memory card connector, automatically copying a specified set of media to the digital memory card and then executing a hardware lock signaling sequence over the digital memory card connector so that the digital memory card is rendered read-only and cannot be subsequently erased.

9. A portable wireless media server device, comprising:
a portable device housing;
a wireless network radio within the housing supporting Wi-Fi and Bluetooth connections;
a processor circuit within the housing and coupled to the wireless network radio;
a micro-SD card connector within the housing and coupled to the processor circuit;
a battery within the housing for providing operating current to the wireless network radio and the processor circuit; and
a memory coupled to the processor circuit for storing program instructions for operating the portable wireless media server device, providing private non-Internet Wi-Fi connections and Bluetooth connections to other wireless devices, and automatically, in response to acceptance of the private non-Internet Wi-Fi connection by a first one of the other wireless devices, pushing a page offering a selection of media or an application image in response to any browser DNS request from the connected Wi-Fi-enabled device so that the browser of the connected Wi-Fi-enabled device executes the page offering selection of the media or the application image, in response to receiving an indication of selection of the application image, delivering an application package to the connected Wi-Fi-enabled device for installation on the connected Wi-Fi-enabled device, in response to receiving an indication of selection of the media, delivering the media to the connected Wi-Fi-enabled device, and automatically, in response to causing the wireless network radio to offer pairing to a Bluetooth device, and responsive to acceptance of a pairing of another Bluetooth device with the portable wireless media server device, delivering preselected media to the Bluetooth device and automatically, responsive to detection of insertion of an SD card into the SD card connector, automatically copying the preselected media to the SD card and then executing a hardware lock signaling sequence over the SD card connector so that the SD card is rendered read-only and cannot be subsequently erased.

10. A method of providing media to persons having wireless mobile telephones, the method comprising:
providing a non-Internet Wi-Fi connection from a portable wireless media server device to at least one of the wireless mobile telephones;
operating the portable wireless media server device with an internal battery; and
responsive to accepting a connection from the at least one of the wireless mobile telephones, pushing a page offering a selection of media or an application image for delivery to the at least one of the wireless mobile telephones;
receiving a user input at a browser of the at least one of the wireless mobile telephones indicating selection of the media or the application image for delivery;
in response to receiving the user input, delivering the media or the application image to the at least one of the wireless mobile telephones;
wherein the pushing the page offering selection of the media or the application image for delivery to the at least one of the wireless mobile telephones comprises: detecting connection of a connected Wi-Fi-enabled device; and pushing the page in response to any browser DNS request from the connected Wi-Fi-enabled device, whereby the portable wireless media server device delivers the media directly to Bluetooth-paired devices as a file and delivers media to the connected Wi-Fi-enabled device only in response to receiving an indication of a user input at the connected Wi-H enabled device selecting the media or the application image; and offering pairing to a Bluetooth device; accepting a Bluetooth connection from the Bluetooth device; and automatically, in response to completing pairing with the Bluetooth device, transferring pre-selected media to the Bluetooth device.

11. The method of claim 10, further comprising accepting pairing with multiple Bluetooth devices, and wherein the automatically transferring the pre-selected media transfers the pre-selected media to individual ones of the multiple Bluetooth devices in response to acceptance of pairing at the individual ones of the multiple Bluetooth devices.

12. The method of claim 10, wherein the pushing the page offering selection of the media or the application image comprises pushing the page that offers selection of the application image, and wherein the delivering the media or the application image comprises delivering an application package containing the application image to the connected Wi-Fi enabled device.

13. The method of claim 10, further comprising:
connecting to the another wireless device;
automatically in response to a browser of the another wireless device issuing any DNS request, delivering and executing the page offering selection of the media or the application image in the browser of the connected Wi-Fi-enabled device;
receiving media selection from the page executing in the browser on the another wireless device; and
delivering the selected media or the application image to the another wireless device.

14. The method of claim 12, further comprising:
providing a digital memory card connector located at a housing of the portable wireless media server device and coupled to the processor circuit for receiving a digital memory card;
detecting insertion of the digital memory card into the digital memory card connector; and
automatically, in response to detecting the insertion of the digital memory card, copying media stored within the portable wireless media server device to the digital memory card.

15. The method of claim 14, wherein the detecting insertion detects insertion of a micro secure digital (micro-SD) card into the digital memory card connector.

16. The method of claim 14, wherein the method further comprises responsive to completion of the automatically copying the media to the digital memory card, executing a hardware lock signaling sequence over the digital memory card connector so that the digital memory card is rendered read-only and cannot be subsequently erased.

* * * * *